United States Patent

[11] 3,555,182

[72] Inventor Dal F. Griepentrog
Indianapolis, Ind.

[21] Appl. No. 730,415
[22] Filed May 20, 1968
[45] Patented Jan. 12, 1971
[73] Assignee RCA Corporation
a corporation of Delaware

[54] PLURAL OPERATING MODE AUTOMATIC GAIN CONTROL SYSTEM
16 Claims, 1 Drawing Fig.

[52] U.S. Cl. .......... 178/7.3, 325/319
[51] Int. Cl. .......... H04n 5/52
[50] Field of Search .......... 178/6AVC, 7.3E, 7.5E, 5.4Test; 325/404, 405, 411, 319

[56] References Cited

UNITED STATES PATENTS

| | | | |
|---|---|---|---|
| 3,182,122 | 5/1965 | Lin Kao | 178/7.3E |
| 3,270,125 | 8/1966 | Kelly et al. | 178/5.4(Test) |
| 3,306,976 | 2/1967 | Massman et al. | 325/319 |
| 3,437,751 | 4/1969 | Hansen | 178/7.3E |
| 3,453,386 | 7/1969 | Hofman | 178/7.3E |
| 3,461,225 | 8/1969 | Crookshanks et al. | 178/5.4(Test) |

*Primary Examiner*—Richard Murray
*Assistant Examiner*—Alfred H. Eddleman
*Attorney*—Eugene M. Whitacre

ABSTRACT: An automatic gain control system for a television receiver employing a fixed biasing arrangement for a video detector, noise inverter, sync separator, and automatic gain control amplifier. The noise inverter operates when noise pulses exceed a threshold limit determined in part by the biasing arrangement. Relatively noise-free sync pulses therefore are supplied to the sync separator and AGC circuit. The AGC circuit is arranged to supply control voltages having different ranges to the R.F. and I.F. amplifiers in the receiver. Furthermore, the AGC circuit operates such that a reference video signal is supplied to the image-reproducing kinescope during a service operating mode.

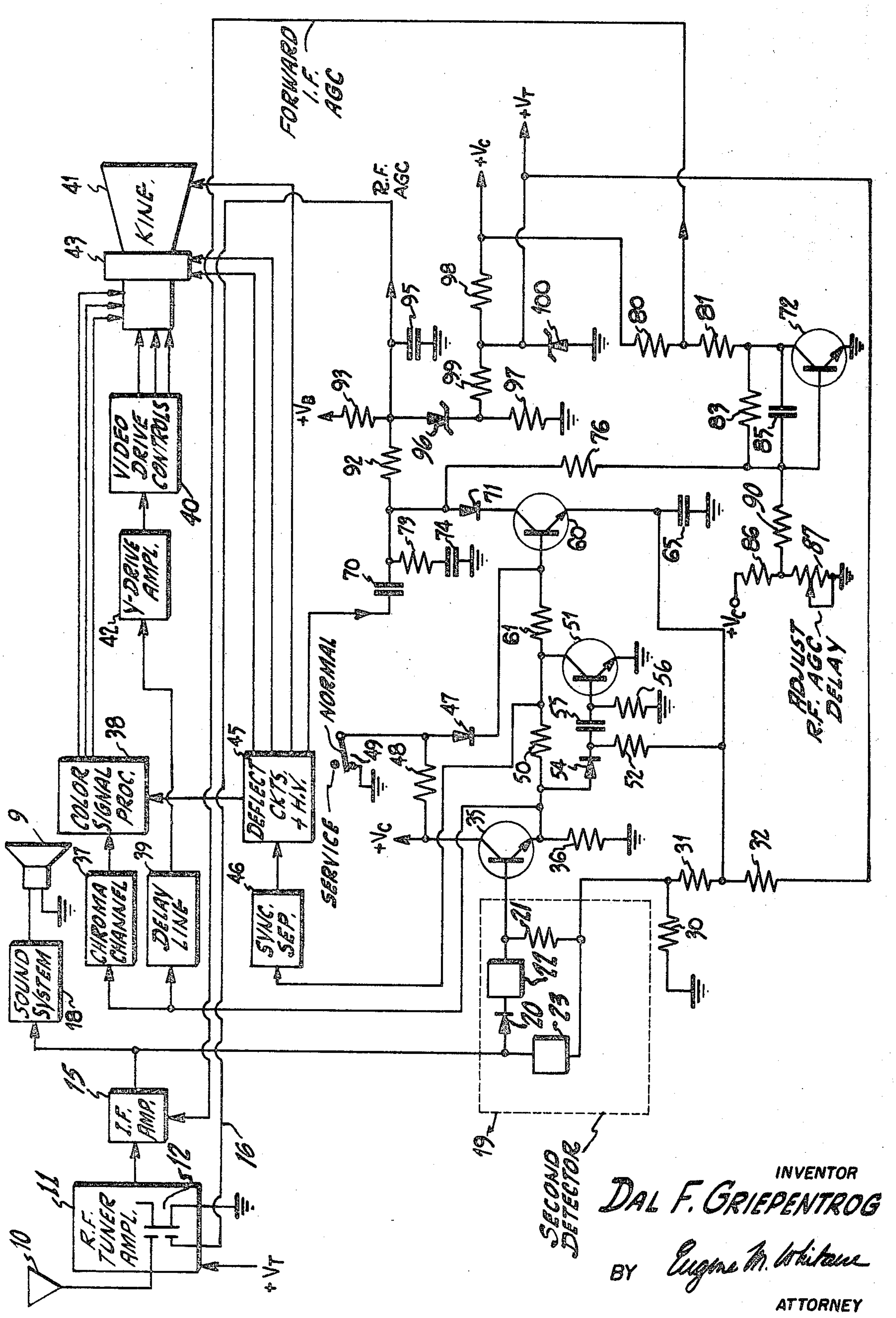
INVENTOR
DAL F. GRIEPENTROG
BY Eugene M. Whitacre
ATTORNEY

PLURAL OPERATING MODE AUTOMATIC GAIN CONTROL SYSTEM

This invention relates to an automatic gain control (AGC) circuit for television receivers and, in particular, to a television AGC circuit having a plurality of operating modes.

In a television receiver, it is desirable that automatic gain control circuits (as well as synchronizing signal separator circuits) be capable of operation with received signals which include substantial spurious noise components. It is also desirable that an AGC circuit be arranged so that, for low level received signals, the receiver radio frequency (R.F.) amplifier be operated at maximum gain and gain control be applied only to the intermediate frequency (I.F.) amplifier. For higher level input signals, it is desirable to control the gain of the R.F. amplifier (i.e. provide an R.F. AGC delay). Furthermore, in color television receivers provided with internal means for producing a blank raster or a narrow horizontal line on the image display device for testing and alignment procedures, it is advantageous that during such testing procedures video signals be prevented from reaching the display device.

In accordance with the present invention, an AGC circuit for a television receiver is provided with noise cancellation means which preferably also is operatively associated with a synchronizing signal separator circuit. Fixed reference biasing means are coupled to the AGC, sync separator, noise cancellation, and video detector portions of the receiver to insure proper operation over a wide range of received signal levels without need for adjustment of variable controls. The AGC circuit is arranged to provide separate R.F. and I.F. gain control voltages. The R.F. gain control circuit is arranged to provide a first limited R.F. gain control voltage of one polarity for a first range of input signal levels, a second limited R.F. gain control voltage of opposite polarity for a second range of input signal levels and an R.F. gain control voltage which varies between said first and second limits for a third range of input signal levels between said first and second ranges.

At the same time, the gain control system is arranged to provide a varying I.F. gain control voltage for the first range of input signal levels, a substantially constant gain control voltage for the third range of input signal levels and a varying gain control voltage for the second range of input signal levels. Means are provided for selecting the transition between the first and third ranges of input signal levels. Furthermore, means are provided for conditioning the AGC circuit for producing reference gain control voltages during a service operating mode of the receiver.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing which illustrates a color television receiver, partially in block diagram and partially in schematic form, embodying the present invention.

Referring to the drawing, an antenna 10 receives transmitted radio frequency (R.F.) television signals and couples these signals to an R.F. tuner amplifier 11.

The R.F. tuner amplifier 11 amplifies and converts the received R.F. television signals into intermediate frequency (I.F.) signals. A dual gate field effect transistor (FET) 12 is employed in R.F. amplifier 11 to amplify the received R.F. signals. One gate is arranged for response to received R.F. signals while the other gate is supplied via lead 16 with a control signal for varying the gain of the R.F. tuner amplifier 11. The I.F. signals produced in the R.F. tuner amplifier 11 are coupled to an I.F. amplifier 15 where they are amplified to a desired level for transmission to a sound system 18 of the television receiver and to a video or second detector 19. The sound system 18 translates sound signal components of the I.F. signal into amplified audio signals which are coupled to speaker 9.

In the video detector 19, a diode 20, responsive to the applied I.F. signals, produces output video signals across a resistor 21. Diode 20 is poled to produce video signals having synchronizing signal voltage components more positive than associated image representative voltage components (i.e. sync positive). Suitable filter networks 22 and 23 are provided to insure recovery of only the desired signal components. A voltage divider comprising resistors 30, 31 and 32 is coupled between a source of potential indicated as $+V_t$ and a source of reference potential (ground). The junction between resistors 31 and 30 is coupled to the junction between resistor 21 and filter 23 so as to maintain the output terminal of the video detector 19 (i.e. the junction between filter 22 and resistor 21) at a predetermined direct potential with reference to ground. The junction of resistors 30 and 31 also is coupled to the anode of diode 20 through a DC path supplied by filter 23.

A video amplifier transistor 35, coupled to the output terminal of video detector 19, is arranged in a common collector or emitter follower configuration to present a high input impedance to the video detector 19 and thereby to avoid loading its output while providing isolation. An emitter resistor 36 is coupled between ground and the emitter electrode of transistor 35 and serves as a low impedance output to drive a chrominance channel 37, a low impedance delay line 39 associated with a luminance channel and additional circuits as will be explained below. The chrominance channel 37 functions to separate color information from the remainder of the detected composite video signals. A color signal processor 38, coupled to chrominance channel 37, processes applied signals to produce, for example, color difference signals. The color difference signals are coupled to appropriate control electrodes of an image reproducing device such as a three gun shadow-mask kinescope 41.

A luminance or "Y" channel signal representing monochrome image information is produced across resistor 36 and then is delayed a suitable amount by delay line 39. The delayed luminance signals are amplified by means of a Y drive amplifier 42, the output of which is coupled to video drive controls 40. Drive controls 40 are arranged for application of the luminance signals to appropriate electrodes e.g., cathodes) of the kinescope 41.

Horizontal and vertical deflection circuits 45 are provided for supplying suitable deflection currents to a yoke 43 associated with kinescope 41. The horizontal deflection portion of deflection circuits 45 also is arranged to generate suitable high magnitude operating potentials for appropriate electrodes of the kinescope 41. A synchronizing signal separator 46 is provided to synchronize the deflection circuits 45 with the received signals.

Video signals developed at the emitter electrode of video amplifier transistor 35 also are coupled via a resistor 50 to the input of a synchronizing signal separator 46. A noise inverting circuit also is coupled to sync separator 46 and comprises a transistor 51 having an emitter electrode coupled to a reference potential such as ground and a collector electrode coupled to the input of sync separator 46. The emitter of video amplifier 35 also is coupled to the anode of a threshold diode 54. The cathode of threshold diode 54 is returned through a resistor 52 to the junction of resistors 31 and 32 (which form part of the reference voltage divider previously described in connection with the video detector 19). A capacitor 55 is coupled between the cathode of diode 54 and the base (input) of transistor 51. A resistor 56 provides a return path to ground for the base electrode of transistor 51. The collector of transistor 51 is coupled to the base of an AGC gate transistor 60 by means of a resistor 61.

Transistor 60 serves as a noise immune automatic gain control (AGC) gate and is coupled to the previously described voltage divider 30, 31, 32 by returning its emitter to the junction of resistors 31 and 32. A capacitor 65 also is coupled to the junction of resistors 31 and 32 and bypasses that junction to ground for alternating current signals. The base of transistor 60 also is coupled to the cathode of a diode 47, the anode of which is returned to the potential supply $+V_c$ through a resistor 48. The junction of resistor 48 and the anode of diode 47 is returned to a contact of a service switch 49, the function of which will be described subsequently.

AGC gate transistor 60 is keyed or activated at the horizontal deflection rate by a pulse waveshape obtained from the deflection circuits 45 via a capacitor 70. Capacitor 70 is coupled to the collector of transistor 60 via a diode 71. A series RC damping network comprising a resistor 73 and a capacitor 74 is coupled to the junction of capacitor 70 and the anode of diode 71. The junction of capacitor 70 and the anode of diode 71 is coupled through series connected resistors 92 and 93 to a source of positive potential $+V_b$. The junction between resistors 92 and 93 is coupled to one terminal of a filter capacitor 95, the other terminal of which is returned to ground. The junction of resistors 92 and 93 also coupled to the anode of a diode 96 which exhibits zener characteristics and is arranged to limit in each sense (polarity) the range of AGC signals applied via lead 16 to the radio frequency amplifier 11. The cathode of the zener diode 96 is coupled to a current limiting resistor 97 which is returned to ground and which also forms part of a voltage and diode further comprising series resistors 98 resistor 99 connected to the positive potential supply $+V_c$. The junction of resistors 98 and 99 is coupled to a further zener diode 100 which is returned to ground and which provides the reference voltage $+V_t$ supplied to the previously mentioned divider comprising resistors 30, 31 and 32.

The junction of capacitor 70 and diode 71 is coupled via a resistor 76 to the base electrode of a transistor 72, which serves as an amplifier for obtaining a suitable I.F. automatic gain control range. Operating potential is supplied to transistor 72 via series resistors 80 and 81 connected between the potential supply $+V_t$ and the collector electrode of transistor 72. The collector electrode of transistor 72 is coupled to its base electrode through the parallel combination of a resistor 83 and a capacitor 85. A current bias adjustment for transistor 72 is obtained by means of a resistive divider comprising a resistor 86 and a variable resistor 87 (designated as "Adjust R.F. Delay") connected between potential supply $+V_c$ and ground. The junction of the resistors 86 and 87 is coupled to the base electrode of transistor 72 via a current limiting resistor 90, all of which serve to control the DC biasing of transistor 72.

Circuit operation will be explained utilizing, by way of example, some typical voltage levels which may be found in a typical television receiver. Video detector 19 provides at its output a video signal having synchronizing signal components at a more positive voltage level than accompanying image representative signal components. Typically video detector 19 provides such a video signal with a peak to peak amplitude of 3 volts, a level normally maintained by the action of the AGC circuit which will be described in detail subsequently. The 3 volt peak to peak signal at the output of video detector 19 corresponds to 85 percent modulation of the carrier supplied to the input of detector 19. This normal video signal level is superimposed on a DC voltage level obtained by coupling the junction of resistor 21 and filter 23 to the junction of resistors 30 and 31. The junction between resistors 30 and 31 is maintained at, for example, 2.3 volts by means of zener diode 100 coupled across the potential supply $+V_t$. For these conditions at the detector 19, the white level to the 3 volt peak to peak, 85 percent modulated video signal is approximately +2.8 volts. The maximum excursion or the top of the sync tip (the most positive portion of the synchronizing signal) is at approximately +5.8 volts. Transistor 35 when conducting maintains approximately 0.6 volts across its base to emitter junction and therefore a peak voltage of approximately 5.2 volts is produced at the emitter electrode of transistor 35 (and therefore at the anode of diode 54) during the sync interval. As previously described, the cathode of diode 54 also is referenced to a point on the voltage divider 30, 31, 32, namely the junction between resistors 31 and 32. The voltage at this point, for example, is maintained at +4.6 volts. It is noted that the emitter electrode of the AGC gate transistor 60 also is returned to this point on the voltage divider and hence also is biased at +4.6 volts. The base electrode of transistor 60, assuming no voltage drop across resistors 50 and 61, is at the same potential as the emitter of transistor 35, which is approximately +5.2 volts during sync interval. In utilizing the above DC level referencing, conduction thresholds are established which enable the AGC and sync separator circuits to operate in the presence of noise without the need for independent AGC and noise threshold adjustments. With the above values, assuming diode 54 is a silicon device, in order for it to conduct, the voltage between its anode and cathode must be approximately 0.6 volts. Substantially the same voltage drop is required across the base to emitter junction of transistor 60 in order for it to conduct. Diode 54, since it is biased in the same manner as the base to emitter junction of transistor 60, just conducts on the tip portion of the synchronizing signals which exceeds 5.2 volts amplitude. Noise pulses above this amplitude and therefore above such "sync tips" are coupled by capacitor 55 to the base electrode of the noise inverter transistor 51. However, transistor 51 also requires a base to emitter voltage of +0.6 volts in order to conduct. Therefore, noise pulses exceeding the sync tips by at least the base to emitter conduction voltage (0.6 volts) of transistor 51 produce inverted noise pulses at the collector of transistor 51 (i.e. at the junction of resistors 50 and 61). Thus, for a video signal having sync tips at 5.8 volts at the output of detector 19, the noise threshold for the inverter transistor 51 is approximately +6.4 volts. Noise pulses above this level cause transistor 51 to conduct and to produce negative pulses at the junction of resistors 50 and 61 which cancel the positive noise pulses coupled from the emitter of transistor 35. Therefore the AGC transistor 60 and the sync separator 46 are protected against excessive noise interference by means of transistor 51 and its associated components. Under the above signal conditions, AGC transistor 60 will conduct just at the sync tips of 5.2 volts. The noise threshold for the noise inverter may be reduced further and brought closer to the sync tip level by using a germanium device for diode 54, which has a lower conduction drop from anode to cathode than the silicon device described above.

Since noise pulses are AC coupled to transistor 51, cancellation of sync from video under transient AGC conditions is prevented. It is possible under severe noise conditions to alter the noise threshold of transistor 51 by maintaining charge across capacitor 55. This effect can be reduced substantially by adding a series resistance (not shown) in the emitter circuit of transistor 51 or by placing a suitable resistor (not shown) in series with diode 54.

In the above description, it was assumed that the AGC circuit maintains the amplitude of the composite video signals at the output of video detector 19 constant at 3 volts peak to peak for a wide range of amplitudes to received R.F. signals. The AGC circuit maintains the desired substantially constant amplitude at the output of detector 19 by providing two AGC voltages having different ranges and different simultaneous values, respectively, for the R.F. tuner amplifier 11 and the I.F. amplifier 15. For low level signals supplied to R.F. amplifier 11, it is desirable to operate amplifier 11 at maximum gain while varying the gain of I.F. amplifier 15. When the R.F. input signal exceeds a predetermined threshold level (determined by receiver noise performance), the AGC circuit is arranged to vary the gain of R.F. amplifier 11 with little variation in the gain of I.F. amplifier 15. Gain control of R.F. amplifier 11 in this case avoids overdriving the mixer which would cause cross-modulation and, in general, distortion. For particularly high level input signals R.F. amplifier 11 is biased to cutoff condition and the AGC circuit again varies only the gain of the I.F. amplifier 15.

The manner in which the AGC circuit operates will now be described for the condition where the input signal level to the R.F. amplifier 11 is low e.g. of the order of 100 microvolts). It will also be assumed that the combined gain of R.F. amplifier 11 and I.F. amplifier 15 initially is too low to produce the nominal 3 volt peak to peak video signal at the output of detector 19.

As stated earlier, the emitter electrode of AGC gate transistor 60 is maintained at +4.6 volts. Since the output of detector 19 is less than the nominal 3 volts peak to peak, the base electrode of AGC gate transistor 60 is supplied with a video signal having sync tips at a lower level than the +5.2 volts required to initiate conduction. Transistor 60 therefore is maintained in cutoff condition even during the sync interval when positive pulses derived from deflection circuits 45 are supplied via capacitor 70.

With respect to the R.F. amplifier 11, it is desired to maintain maximum gain under these conditions. At this time, diode 96 is forward biased by means of the positive supply $+V_b$ and resistor 93. The R.F. AGC voltage across capacitor 95 is determined by the substantially fixed reference voltage provided at the junction of resistors 97 and 99. The voltage at this junction is a predetermined fraction of the substantially fixed voltage across zener diode 100 and is selected, for example, equal to +6.0 volts, since diode 96 is forward biased e.g. +0.7 volts anode to cathode) the voltage across capacitor 95 is maintained at +6.7 volts for this condition. Field effect transistor 12 in R.F. amplifier 11 is arranged to provide maximum gain for this R.F. amplifier 11 is arranged to provide maximum gain for this R.F. AGC output voltage.

Variable gain control is provided under these conditions by means of a varying I.F. AGC voltage supplied to I.F. amplifier 15 by means of transistor 72 in the following manner. The positive pulses provided by deflection circuit 45, as noted above, are ineffective to initiate conduction in AGC gate 60 and also have no effect on transistor 72 (i.e. capacitor 85 acts to filter the keying pulses.)

The degree of conduction in the output circuit (resistors 80, 81) of transistor 72 is dependent upon the base current supplied to transistor 72. The base current, in turn, is dependent upon the base bias derived from the combination of resistors 86 and 87 coupled to the $+V_c$ potential supply, resistors 92 and 93 coupled to the $+V_b$ supply and the charge condition of capacitor 70. For the stated condition of low R.F. signal input level e.g. 100 microvolts) and the insufficient system gain to produce the nominal signal level at the output of detector 19, transistor 72 provides a relatively high output current which, in turn, produces a relatively low I.F. AGC voltage at the junction of resistors 80 and 81.

I.F. amplifier 15 is arranged such that a relatively low AGC voltage corresponds to relatively high gain of I.F. amplifier 15 (i.e. transistor in I.F. amplifier 15 operated in forward AGC mode). The video level at the output of detector 19 therefore is increased until the nominal 3 volt peak to peak level is reached.

If the level of the video available at the output of detector 19 is greater than 3 volts peak to peak, a video signal will be produced at the base electrode of transistor 60 with sync tips at a higher positive potential than is normal. Therefore, when the positive horizontal gating pulse occurs, transistor 60 is driven into conduction and offers a low impedance charge path for capacitor 70 through diode 71. The capacitor 70 charges such that the terminal coupled to resistor 92 assumes a negative voltage with respect to the terminal coupled to the deflection circuit 45. As a result, base drive current for transistor 72 is reduced, conduction in transistor 72 decreases, the I.F. AGC output voltage increases and the gain of I.F. amplifier 15 decreases so as to restore the nominal 3 volt peak to peak level at the output of detector 19.

The operating conditions described above apply for all R.F. input signal levels up to a level determined by the setting of R.F. AGC delay potentiometer 87. The setting of potentiometer 87 determines the gain characteristics of I.F. AGC transistor 72 and therefore determines the input signal level at which the R.F. AGC circuit becomes effective to vary receiver gain. For the maximum resistance setting of potentiometer 87, transistor 72 is biased for maximum conduction (minimum delay) while for minimum resistance setting, transistor 72 is biased for minimum conduction (maximum delay). In practice, potentiometer 87 is adjusted so that for a nominal R.F. input signal level e.g. 500 microvolts), the gain of R.F. amplifier 11 is sufficient to provide a noise free image on the kinescope 41. It can be expected, unless the gain of R.F. amplifier 11 is at its maximum value for the above selected input signal level, that noise free images may also be obtained with lower input signal levels.

When the R.F. input signal level exceeds the predetermined threshold level established by operation of R.F. AGC delay potentiometer 87, the R.F. AGC output voltage is caused to vary in the following manner. For this condition, the voltage produced at the junction of capacitor 70 and resistor 92 is sufficiently low (or actually may be negative) that diode 96 no longer is maintained in its forward conduction condition. The voltage across capacitor 95 therefore no longer is maintained at the reference +6.7 volts described above but rather decreases (eventually becoming negative) as the R.F. input signal level increases.

Diode 96 acts as reverse biased diode (i.e. high impedance) under these conditions. Variations in R.F. input signal level produce momentary variations in the output of detector 19. These variations in detector output cause AGC gate 60 to conduct more or less as its input level increases or decreases, thereby charging capacitor 70 more or less, respectively, during sync time. The charge state of capacitor 70 is reflected in the voltage produced across R.F. AGC output capacitor 95 under these conditions (i.e. diode 96 reverse biased). The voltage across capacitor 95 varies between a positive voltage limit (e.g. +6.7 volts corresponding to maximum R.F. gain) and a negative limit (e.g. −4.7 volts corresponding to minimum R.F. gain) over the range of input signal levels for which the gain of R.F. amplifier 11 is varied. For most of this range of input signal levels, the gain of I.F. amplifier 15 is maintained substantially constant or is varied only slightly.

At the point where the R.F. input signal level is sufficient to produce an R.F. AGC output voltage of −4.7 volts across capacitor 95, diode 96 is caused to operate in its zener region and limits the negative voltage supplied to R.F. tuner 11. As noted earlier, the voltage at the cathode of zener diode 96 is maintained at a level of +6.0 volts. Therefore, in order to limit the negative excursion across capacitor 95 to −4.7 volts, diode 96 is selected to provide zener limiting when its anode to cathode voltage is −10.7 volts. FET transistor 12 is protected against reverse voltage breakdown by means of the zener action of diode 96. Gain control is transferred at this signal level to I.F. AGC transistor 72 which operates as in the first case.

In the illustrated embodiment, in order to obtain a sharp zener characteristic or a sharp increase in reverse current at the specified reverse voltage of 10.7 volts, the base to emitter junction of a transistor is utilized for zener diode 96. It has been found that base to emitter junctions in certain types of transistors exhibit sharper zener characteristics than do diodes fabricated specifically for zener operation. The sharpness of the zener response is related to the sharpness of the R.F. AGC response and is desirable to improve circuit performance. Furthermore, such a transistor with its collector electrode open-circuited may be more economical than a zener diode.

Various control voltage levels are obtainable under different operating conditions within the extreme ranges described above and hence an AGC control with suitable range is available for both the R.F. and I.F. stages. For the conditions described above, the values of the circuit components are selected so that the emitter of transistor 60 and the video detector are biased by the voltage divider comprising resistors 30, 31 and 32 to enable the AGC control ranges as described above to maintain the output at the video detector at 3 volts peak to peak with 85 percent carrier modulation.

A. further application of the keyed AGC transistor 60 is available during servicing or testing of a color receiver using this invention. During such modes it is desirable to provide a blank raster on the screen of kinescope 41 so that color temperature may be adjusted. This mode then requires removing video information from the raster to permit such adjustment. Furthermore, in receivers employing a service switch position wherein vertical deflection is disabled to permit adjustment of the kinescope screen voltages for setting optimum cutoff bias, video information should also be eliminated. Video information may be prevented from reaching the kinescope by reducing the R.F. and/or I.F. gain to reduce the video signal to zero at the output of the second detector. The gated AGC transistor 60 is controlled to perform this gain reduction function, a diode 47, having its anode coupled to a source of positive potential $+V_c$ through a resistor 48 and its cathode coupled to the base of AGC transistor 60, is coupled to ground during normal receiver operation by means of a first pair of contacts on a "SERVICE" switch 49. Diode 47 is biased with a reverse voltage at this time allowing transistor 60 to operate normally. When the service switch 49 is placed in a service mode, ground is removed from the anode of diode 47 and diode 47 becomes forward biased. Current supplied through resistor 48 and diode 47 causes transistor 60 to conduct beyond saturation level. Therefore, as described above, the gain of both the R.F. tuner 11 and the I.F. amplifier 15 are decrease such that no video output is produced from detector 19. The base current provided to transistor 60 is determined by the supply voltage $+V_c$ and the magnitude of resistor 48 and also serves to raise the voltage at the detector 19. This last-mentioned effect occurs as current flows through the base to emitter junction of transistor 60 and to ground through resistors 31 and 30 in the voltage divider. This current then raises the DC potential at the video detector from 2.3 volts, described above, to approximately 3.7 volts, which is a level between black and white. In this manner the brightness of the blank raster on the face of the kinescope 41 is comparable to a brightness obtainable during normal operation. If transistor 60 were merely saturated as in this case of normal operation for low gain control, the voltage at the divider would be substantially unaffected and hence would produce a whiter than white raster in the absence of video signals at the output of the second detector 19.

In a system of practical construction operating in accordance with the principles described, component value were as follows:

| | | |
|---|---|---|
| Resistor 30 | ohms | 390 |
| Resistor 31 | do | 390 |
| Resistor 32 | do | 1, 800 |
| Resistor 36 | do | 1, 000 |
| Resistor 48 | do | 3, 900 |
| Resistor 50 | do | 470 |
| Resistor 52 | do | 10, 000 |
| Resistor 61 | do | 1, 000 |
| Resistor 73 | do | 68, 000 |
| Resistor 76 | do | 1, 000, 000 |
| Resistor 80 | do | 3, 300 |
| Resistor 81 | do | 1, 500 |
| Resistor 83 | do | 150, 000 |
| Resistor 86 | do | 270, 000 |
| Resistor 87 | ohms [1] | 20, 000 |
| Resistor 90 | ohms | 22, 000 |
| Resistor 92 | do | 1, 000, 000 |
| Resistor 93 | do | 3, 300, 000 |
| Resistor 97 | do | 2, 200 |
| Resistor 98 | do | 220 |
| Resistor 99 | do | 3, 300 |
| Capacitor 55 | microfarads | 0. 1 |
| Capacitor 65 | do | 20 |
| Capacitor 70 | picofarads | 820 |
| Capacitor 74 | microfarads | . 027 |
| Capacitor 85 | do | . 068 |
| Capacitor 95 | do | . 18 |
| Transistor 35 | | SE1002 |
| Transistor 51 | | 2N3646 |
| Transistor 60 | | 2N3440 |
| Transistor 72 | | 2N3565 |
| Diode 54 | Silicon FD 100 | |
| Diode 71 | FD 222 | |
| Diode 96 | Base to emitter junction of SE4002 or 10.8 v. zener. | |
| Diode 100 | 15 volt zener | |
| $+V_c$ | volts | +30 |
| $+V_t$ | do | +15 |
| $+V_b$ | do | +155 |

[1] Variable.

I claim:

1. In a television receiver having a source of composite television signals including image brightness representative signal components and regularly recurring synchronizing signal components extending in amplitude beyond said image brightness representative signal components, the combination comprising:

automatic gain control means coupled to said source of composite signals for maintaining said synchronizing signal components at a substantially fixed level;

noise threshold means coupled to said source of composite signals responsive to noise components exceeding said fixed level by a predetermined amount;

a voltage divider including a plurality of resistive elements connected in a single series path between a first terminal adapted for application thereto of a source of stable operating potential and a second terminal coupled to a point of reference potential;

means coupled to a first point on said voltage divider for supplying a first fixed reference voltage to said source of composite signals and for supplying a second fixed reference voltage available at a second point on said divider, to each of said noise threshold and automatic gain control means, whereby said divider provides a common bias and current path for said source of composite signals, said automatic gain control means and said noise threshold means, for establishing said fixed level;

a synchronizing signal separator circuit; and means for coupling said noise threshold means to each of said automatic gain control means and to said synchronizing signal separator circuit.

2. The combination according to claim 1 wherein:

said source of composite television signals comprises means for detecting said brightness representative and synchronizing signal components; and said first point on said voltage divider being coupled to said detecting means.

3. The combination according to claim 2 and further comprising noise inverting means having an input alternating current coupled to said noise threshold means and an output direct current coupled to each of said automatic gain control and synchronizing signal separator circuits.

4. The combination according to claim 2 wherein said detecting means comprises a diode having anode and cathode electrodes, said diode being poled for conduction upon application of positive polarity signals.

5. The combination according to claim 4 wherein said source of stable operating potential provides a substantially constant voltage of positive polarity.

6. The combination according to claim 5 wherein said first fixed reference voltage is less than said second fixed reference voltage.

7. The combination according to claim 6 and further comprising noise inverting means having an input alternating current coupled to said noise threshold means and an output circuit direct current coupled to each of said automatic gain control and synchronizing signal separator circuits.

8. The combination according to claim 7 wherein said detecting means comprises a diode having anode and cathode electrodes;

said diode being poled for conduction upon application of positive polarity signals;

said source of stable operating potential provides a substantially constant voltage of positive polarity; and said first reference voltage is less than said second reference voltage.

9. In a television receiver having a source of composite television signals which includes radio frequency and intermediate frequency amplifiers, the television signal being characterized by synchronizing signal components recurring at a regular rate and image brightness representative signal components, automatic gain control means comprising;

a source of pulses recurring substantially at said synchronizing signal rate;

gating circuit means coupled to said source of pulses, coupled to said source of composite signals and responsive jointly thereto to produce a gain control effect for maintaining said synchronizing signal components at a predetermined level;

output circuit means coupled to said gating circuit means and to said source of composite television signals; said output circuit means comprising;

means for limiting said gain control effect to a first voltage level of a first polarity for a first range of input signal levels to said radio frequency amplifier, to a second voltage level of opposite polarity for a second range of input signal levels to said radio frequency amplifier and for providing a gain control voltage which varies between said first and second voltage levels for a range of input signal levels between said first and second ranges.

10. Automatic gain control means in accordance with claim 9 wherein said output circuit means comprises a diode, first voltage supply means coupled to aid diode and to said gating means, and second voltage supply means coupled to said diode, said first and second voltage supply means maintaining said diode in forward conduction and zener conduction conditions, respectively, for said first and second ranges of input signal levels.

11. Automatic gain control means in accordance with claim 10 and further comprising capacitive means for coupling said gating circuit means to said source of pulses and for coupling to said output circuit means, in response to said pulses, a voltage of opposite polarity with respect to said first voltage supply means.

12. Automatic gain control means in accordance with claim 11 wherein said first voltage supply means comprises a first source of voltage, voltage divider means coupled across said first source of voltage and having at least first and second junctions couple, respectively, to said diode and to said capacitive means.

13. Automatic gain control means in accordance with claim 12 wherein said diode comprises anode and cathode electrodes, said first voltage supply means being coupled to said anode, and said second voltage supply means being coupled to said cathode and arranged to supply a voltage less than that of said first source. .

14. Automatic gain control means in accordance with claim 12 wherein said output circuit means further comprises amplifying means coupled to said capacitive means for supplying varying gain control voltage to said intermediate frequency amplifier so as to produce a varying gain therein for said first and second ranges and a substantially invariant gain for said range between said first and second ranges.

15. Automatic gain control means in accordance with claim 12 and further comprising adjustable biasing means coupled to said amplifying means and to said voltage divider means for adjustably selecting said first range of signal levels.

16. In a television receiver having a source of composite television signals which includes components; frequency and intermediate frequency amplifiers, the television signals being characterized by synchronizing signal components and image brightness representative components, automatic gain control means comprising:

a source of pulses recurring substantially at the rate of said synchronizing signal components;

gating circuit means coupled to said source of pulses, coupled to said source of composite signals and responsive jointly thereto to produce a gain control effect for maintaining said synchronizing signal components at a predetermined level;

output circuit means coupled to said gating circuit means and to said source of composite television signals for supplying thereto gain control voltage to maintain said predetermined level;

servicing supply means coupled to said gating circuit means for energizing said gating circuit means so as to reduce the gain of said source of composite signal;

switching means for disabling said supply means in a normal operating condition and for energizing said supply means in a service operating condition; and voltage supply means including a voltage divider coupled to said gating circuit means and to said source of composite signals responsive to energization of said service in supply means for producing a reference output signal level at said source of composite signals.

UNITED STATES PATENT OFFICE

CERTIFICATE OF CORRECTION

Patent No. 3,555,182 Dated January 12, 1971

Inventor(s) Dal F. Griepentrog

It is certified that error appears in the above-identified patent and that said Letters Patent are hereby corrected as shown below:

Column 4, line 54, that portion reading "to received" shoul read -- of received --.

Column 5, lines 24-27, that portion reading "Field effect transistor 12 in R.F. amplifier 11 is arranged to provide maximum gain for this R.F. amplifier 11 is arranged to provide maximum gain for this R.F. AGC output voltage." should read -- Field effect transistor 12 in R.F. amplifier 11 is arranged to provide maximum gain for this R.F. AGC output voltage. --.

Column 7, line 18, that portion reading "mode, ground" shou read -- mode, corresponding to the collapsed raster or blan raster mode, ground --.

Column 7, line 64, that portion reading "0.1" should read -- .01 --.

Column 9, line 31, that portion reading "aid diode" should read -- said diode --.

Column 10, line 19, that portion reading "includes componen frequency" should read -- includes radio frequency --.

Column 10, line 43, that portion reading "said service in supply" should read -- said servicing supply --.

Signed and sealed this 22nd day of February 1972.

(SEAL)
Attest:

EDWARD M.FLETCHER,JR.
Attesting Officer

ROBERT GOTTSCHALK
Commissioner of Patents